(No Model.)
E. P. RYDER.
CHIMNEY CAP OR VENTILATOR.
No. 399,566. Patented Mar. 12, 1889.
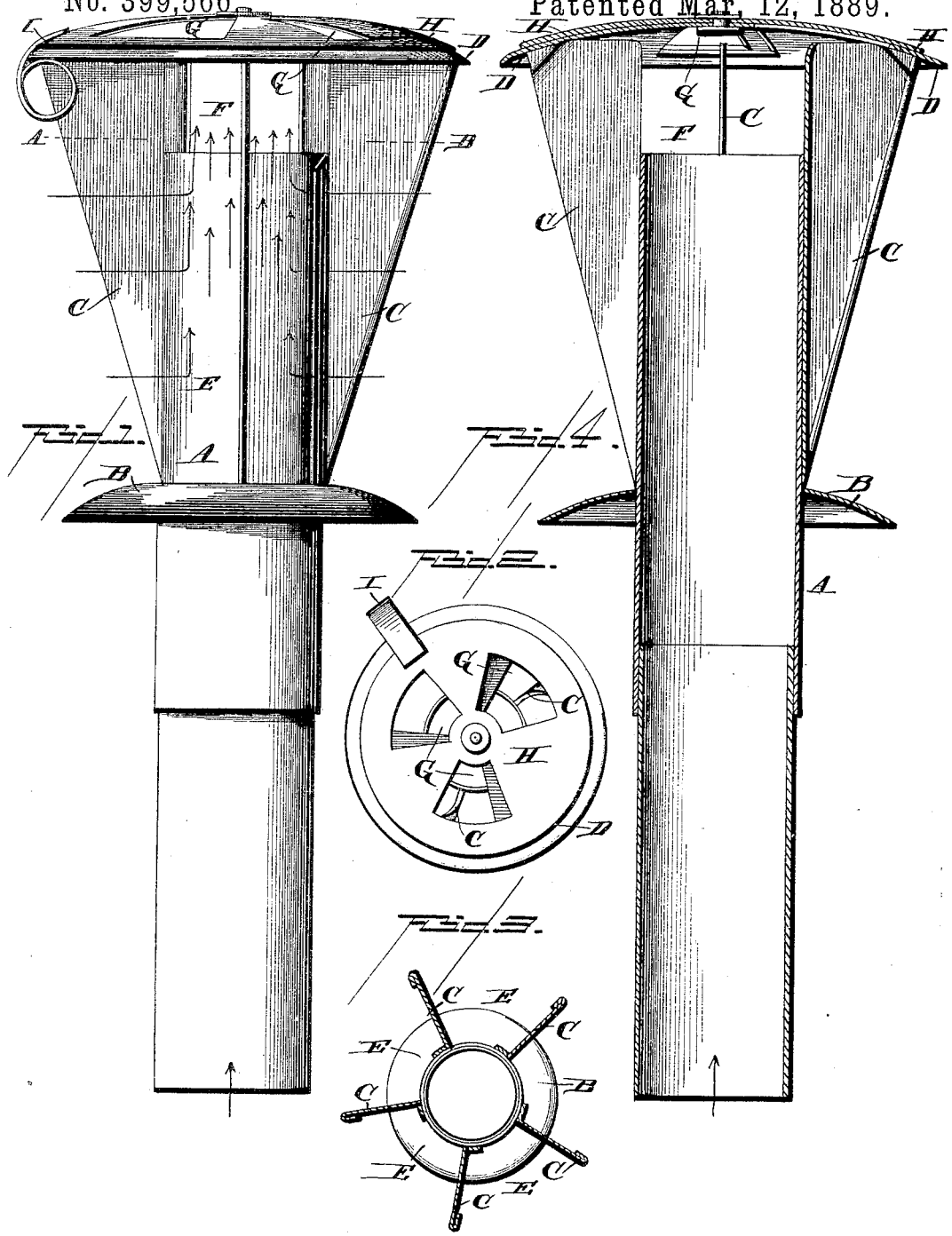

UNITED STATES PATENT OFFICE.

EDWIN P. RYDER, OF PORT JEFFERSON, NEW YORK.

CHIMNEY CAP OR VENTILATOR.

SPECIFICATION forming part of Letters Patent No. 399,566, dated March 12, 1889.

Application filed October 17, 1888. Serial No. 288,350. (No model.)

*To all whom it may concern:*

Be it known that I, EDWIN P. RYDER, a citizen of the United States, residing at Port Jefferson, in the county of Suffolk and State of New York, have invented new and useful Improvements in Chimney Caps or Ventilators, of which the following is a specification.

I have produced an improved draft-cap and ventilator for chimneys, smoke-stacks, and specially adapted for use on the pipes of stoves of ships. It consists of a pipe-section which forms a continuation of the chimney-flue or smoke-pipe, having wings which stand radially upon the outer walls of the pipe from a point some distance below its upper flue end to a point some distance above its upper flue end, and which wings increase in width from their lower ends to their upper ends, so that their greatest width will be above the flue-top, where they are capped by a circular plate, which may overhang their outer edges. This construction provides a series of tapering outside wall-troughs around the flue-pipe, all terminating above its top so as to collect the wind on the outer side of the flue-pipe and direct it beneath the cap-plate out over the end of the pipe in a manner to create a draft therein, from whatever direction the wind may be. The peculiar upward widening form of the outside radial wall-wings has the effect to direct the wind upward in increasing volume over the open end of the pipe, producing an upward suction therein.

The accompanying drawings illustrate my improved draft-cap and the action of the wind within the outside wall-troughs to create a draft within the pipe, in which—

Figure 1 is a side elevation; Fig. 2, a top view. Fig. 3 is a horizontal section on the line A B of Fig. 1, and Fig. 4 is a vertical section.

The cap-pipe section A is inserted into the chimney-flue, or may form a continuation of a smoke stack or pipe, or of a ventilating pipe or flue, and may be supported in such position by a collar, B, which may rest upon the chimney or other part through which the flue passes. This pipe-section is of suitable length, and is provided on its outer walls with flanges or wings C standing radially and extending vertically, preferably from the said supporting-collar to a suitable point above the flue-top, where they are capped by a plate, D, preferably of circular form and concave, or slightly conical, and preferably of a diameter sufficient to slightly overhang the wings. These flanges or wings are preferably of the tapering form shown—that is to say, made to increase in their projection from the pipe-wall from their lower to their upper ends, such increase being sufficient to form troughs E upon and around the wall of the pipe, gradually increasing in depth to the cap-plate, so as to open above the flue-top, open all around, and forming top openings, F, between each pair of wings, through which the wind rising in separate wall-troughs may pass out directly over the flue-top, and thereby create an upward draft within the flue.

For ship use the cap-plate is preferably formed with openings G, and when so formed is provided with a registering-plate, H, pivoted to the cap-plate and having openings registering with the cap-openings for the purpose of regulating the draft in the flue. A suitable handle, I, is provided for adjusting the registering-plate so as to open and to close, or to set the latter, as may be desired. When this register is open, the draft is increased; and this is particularly desirable when there is no wind, when the smoke-pipe is comparatively short, and when there is but little natural draft. In this case the wall-troughs will direct the draft up through the register-openings.

For effecting ventilation in buildings the wall-troughs will form windways over the flue-top regardless of the direction from which the wind may come, and give an effective draft at all times.

From whatever direction the wind may blow, the trough-forming wings will at all times form tapering faces, catching, directing, and increasing the volume of the air between them and delivering it in a concentrated volume out over the flue-top. The wind acting upon the outer side of the flue-pipe will increase in volume from the lower pointed ends of the wings as it rises in the wall-troughs to the widest ends of the wings.

I claim—

1. In a chimney cap or ventilator, the flue-pipe section A, having the radial wings or flanges C, and the cap D, supported thereon, the said wings or flanges extending from below to above the pipe-top on its outer side, gradually increasing in width to their upper ends, and the said cap forming a clear way and through side opening all round between the wings at the top of the pipe, as shown and described.

2. In a chimney cap or ventilator, the flue-pipe section A, having the collar B, the radial wings or flanges C, and the cap D, the said wings or flanges starting from a point on the pipe at the collar and extending above the top of said pipe, gradually increasing in width from said collar to their upper ends, and supporting the cap-plate to form a clear way and through side opening all round between the wings at the top of the pipe, as shown and described.

In testimony whereof I have hereunto set my hand in the presence of two subscribing witnesses.

EDWIN P. RYDER.

Witnesses:
GEORGE P. SCHRYVER,
M. V. DAVIS.